(12) United States Patent
Wang et al.

(10) Patent No.: US 8,517,716 B2
(45) Date of Patent: Aug. 27, 2013

(54) INJECTION MOLD

(75) Inventors: Xian-Yun Wang, Guang-Dong (CN);
Xiao-Ping Wu, Guang-Dong (CN);
Kun-Hsueh Chiang, New Taipei (TW);
Wen-Peng Gong, Guang-Dong (CN);
Jian-Ming Li, Guang-Dong (CN)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 169 days.

(21) Appl. No.: 13/281,418

(22) Filed: Oct. 25, 2011

(65) Prior Publication Data

US 2013/0101693 A1  Apr. 25, 2013

(51) Int. Cl.
*B29C 45/44* (2006.01)

(52) U.S. Cl.
USPC 425/556; 425/441; 425/DIG. 5; 425/DIG. 58

(58) Field of Classification Search
USPC ............ 425/438, 441, 556, DIG. 5, DIG. 58; 264/334
See application file for complete search history.

(56) References Cited

U.S. PATENT DOCUMENTS

| | | | | |
|---|---|---|---|---|
| 2,982,997 A * | 5/1961 | Peickii et al. | ................. | 425/193 |
| 2,994,921 A * | 8/1961 | Hultgren | ....................... | 425/308 |
| 3,049,759 A * | 8/1962 | Eberhardt | ..................... | 425/438 |
| 4,515,342 A * | 5/1985 | Boskovic | ...................... | 249/122 |
| 4,765,585 A * | 8/1988 | Wieder | ........................... | 249/64 |
| 4,889,480 A * | 12/1989 | Nakamura et al. | ............ | 425/577 |
| 5,378,422 A * | 1/1995 | Musiel et al. | ................. | 264/238 |
| 5,407,344 A * | 4/1995 | Rombalski et al. | ........... | 425/190 |
| 6,609,903 B2 * | 8/2003 | Kurimoto | ...................... | 425/556 |
| 7,121,823 B2 * | 10/2006 | Chen et al. | .................... | 425/438 |
| 7,175,421 B2 * | 2/2007 | Takemoto et al. | ............ | 425/577 |
| 7,264,465 B2 * | 9/2007 | Schwaiger et al. | ........... | 425/577 |
| 7,381,051 B2 * | 6/2008 | Wang et al. | .................... | 425/577 |
| 7,846,370 B2 * | 12/2010 | Yu | ................................. | 264/318 |
| 8,147,238 B1 * | 4/2012 | Zou et al. | ...................... | 425/577 |
| 8,371,842 B2 * | 2/2013 | Li et al. | ......................... | 425/556 |
| 2004/0076703 A1 * | 4/2004 | Saulle | ............................ | 425/190 |
| 2011/0280985 A1 * | 11/2011 | Santos et al. | .................. | 425/556 |
| 2012/0082752 A1 * | 4/2012 | Li et al. | ......................... | 425/556 |
| 2012/0107440 A1 * | 5/2012 | Li et al. | ......................... | 425/441 |

* cited by examiner

*Primary Examiner* — Yogendra Gupta
*Assistant Examiner* — Emmanuel S Luk
(74) *Attorney, Agent, or Firm* — Cheng-Ju Chiang

(57) ABSTRACT

An injection mold for molding a product which has an inclined groove and a straight gap at a side thereof includes a female mold and a male mold. The female mold includes a female core and an inclined pillar mounted in the female mold. The male mold includes a male core, a first sliding block and a second sliding block. The first sliding block is slidably mounted on the male mold, and has an inclined guiding surface. The second sliding block is slidably mounted on the inclined guiding surface. When the injection mold is opened, the second sliding block is smoothly parted from the product along the inclined guiding surface to form the inclined groove, and then, the first sliding block is parted from the product to form the straight gap under the action of the inclined pillar.

6 Claims, 5 Drawing Sheets

INJECTION MOLD

BACKGROUND OF THE INVENTION

1. Field of the Invention

The present invention generally relates to an injection mold, and more particularly to an injection mold capable of unloading a product from the injection mold effectively.

2. The Related Art

In general, an injection mold for molding a product includes a male mold and a female mold. The product has an inclined groove at an upper portion of a side thereof and a straight gap at a lower portion of the side thereof. The male mold includes a male core mounted in a middle of a top of the male mold, and a sliding block. The sliding block has an inclined lump extended slantwise from an upper portion of a side of the sliding block, and a straight bar extended sideward from a lower portion of the side of the sliding block. The sliding block is slidably mounted on one side of the top of the male mold with the inclined lump and the straight bar facing to the male core. When the injection mold is closed, a shaping chamber is formed among a bottom of the female mold, a top of the male core, the inclined lump of the sliding block, and the straight bar of the sliding block. Then thermoplastic resins are injected into the injection mold. The thermoplastic resins are solidified for a predetermined time to form the product in the shaping chamber. When the injection mold is opened, the sliding block is driven to slide away from the male core to make the inclined lump and the straight bar parted from the product to form the inclined groove and the straight gap in the side of the product and spaced from each other.

However, the sliding block just slides away from the male core along a longitudinal direction on the male mold to pull the straight bar out of the straight gap and the inclined lump out of the inclined groove simultaneously, in that event, the inclined lump is apt to be damaged on account of being pulled out from the inclined groove along the longitudinal direction that results in a higher defective rate of the product and increases manufacturing cost of the product.

SUMMARY OF THE INVENTION

An object of the present invention is to provide an injection mold for molding a product which has an inclined groove and a straight gap located at a side thereof and spaced from each other. The injection mold includes a female mold and a male mold. The female mold includes a female core mounted in a bottom of the female mold, and an inclined pillar slantwise mounted in the female mold with a bottom end thereof stretching under the female mold. The male mold is positioned under the female mold when the injection mold is closed. One side of a top of the male mold defines a receiving space. The male mold includes a male core, a first sliding block and a second sliding block. The male core is mounted in the top of the male mold and spaced from the receiving space, and has a top thereof spaced from a bottom of the female core to define a shaping cavity therebetween for molding the product. The first sliding block is slidably mounted on the one side of the top of the male mold, and has an inclined top surface designed as an inclined guiding surface. A straight bar is protruded towards the male core from an end surface of the first sliding block and projected into the shaping cavity. The first sliding block defines an inserting space extending slantwise to penetrate therethrough. The second sliding block is slidably mounted on the inclined guiding surface of the first sliding block, and has an inclined lump slantwise protruded towards the male core from one end surface of the second sliding block and projected into the shaping cavity. A tilt angle of the inclined lump is the same as that of the inclined guiding surface. The second sliding block defines an inserting perforation extending slantwise to penetrate therethrough, and narrower than the inserting space of the first sliding block in diameter. The bottom end of the inclined pillar is inserted into the receiving space through the inserting perforation and the inserting space so as to drive the first and second sliding blocks to slide towards the male core in process of closing the injection mold until the bottom of the female core against a top of the second sliding block and the first sliding block resisting against the male core. When the injection mold is opened, the second sliding block slides away from the male core under the action of the inclined pillar and along the inclined guiding surface, to make the inclined lump of the second sliding block smoothly parted from the product so as to form the inclined groove at an upper portion of the side of the product. When the inclined pillar abuts against an inner side face of the inserting space, the first sliding block slides away from the male core on the top of the male mold to make the straight bar parted from the product to form the straight gap at a lower portion of the side of the product.

As described above, the inserting space is wider than the inserting perforation in diameter for facilitating the second sliding block away from the male core ahead of the first sliding block so as to make the inclined lump of the second sliding block and the straight bar of the first sliding block parted from the product separately. Furthermore, the tilt angle of the inclined lump is the same as that of the inclined guiding surface to make the second sliding block slide away from the male core along the inclined guiding surface to make the inclined lump of the second sliding block smoothly parted from the product, and then, the first sliding block slides away from the male core on the top of the male mold to make the straight bar parted from the product steadily. So, the product is effectively unloaded from the injection mold to ensure a successful production of the product to lower defective rate of the product and decrease manufacturing cost of the product.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
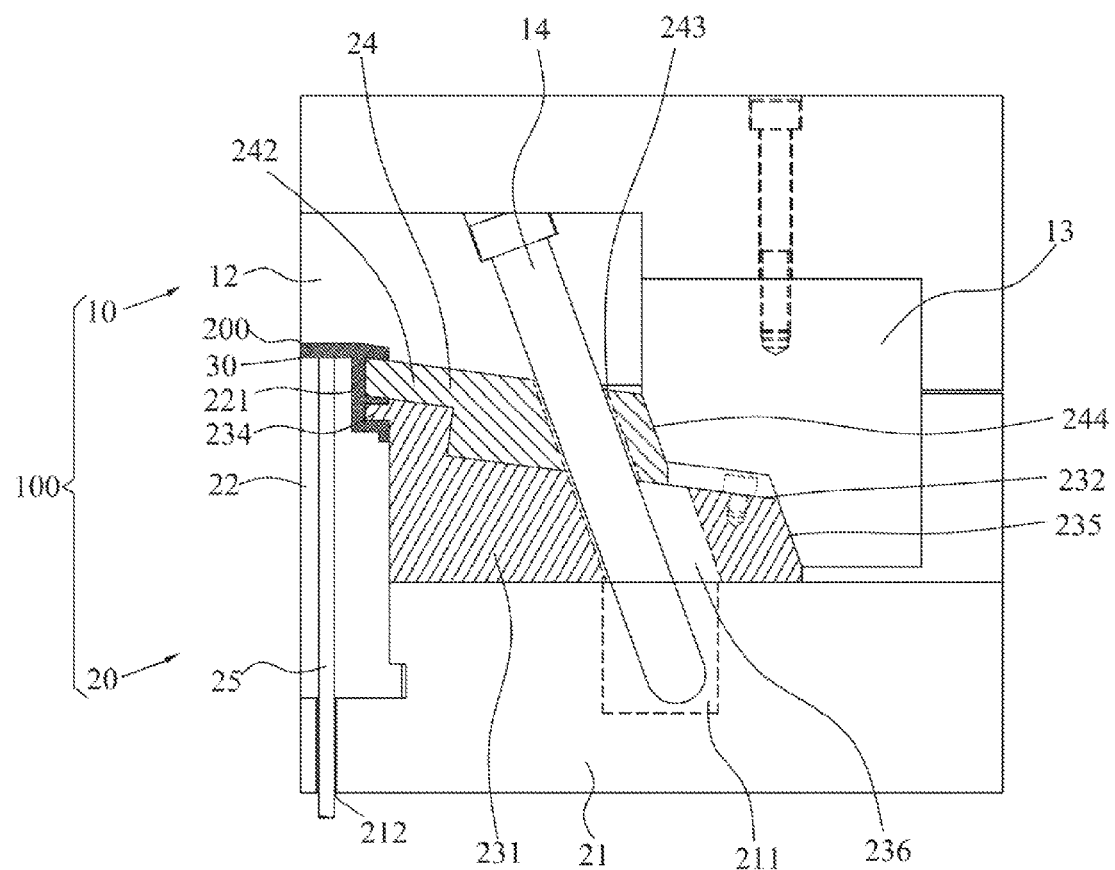
FIG. 1 is a partially sectional view of an injection mold in accordance with the present invention, wherein the injection mold is closed with a product being molded therein.
Figure 2:
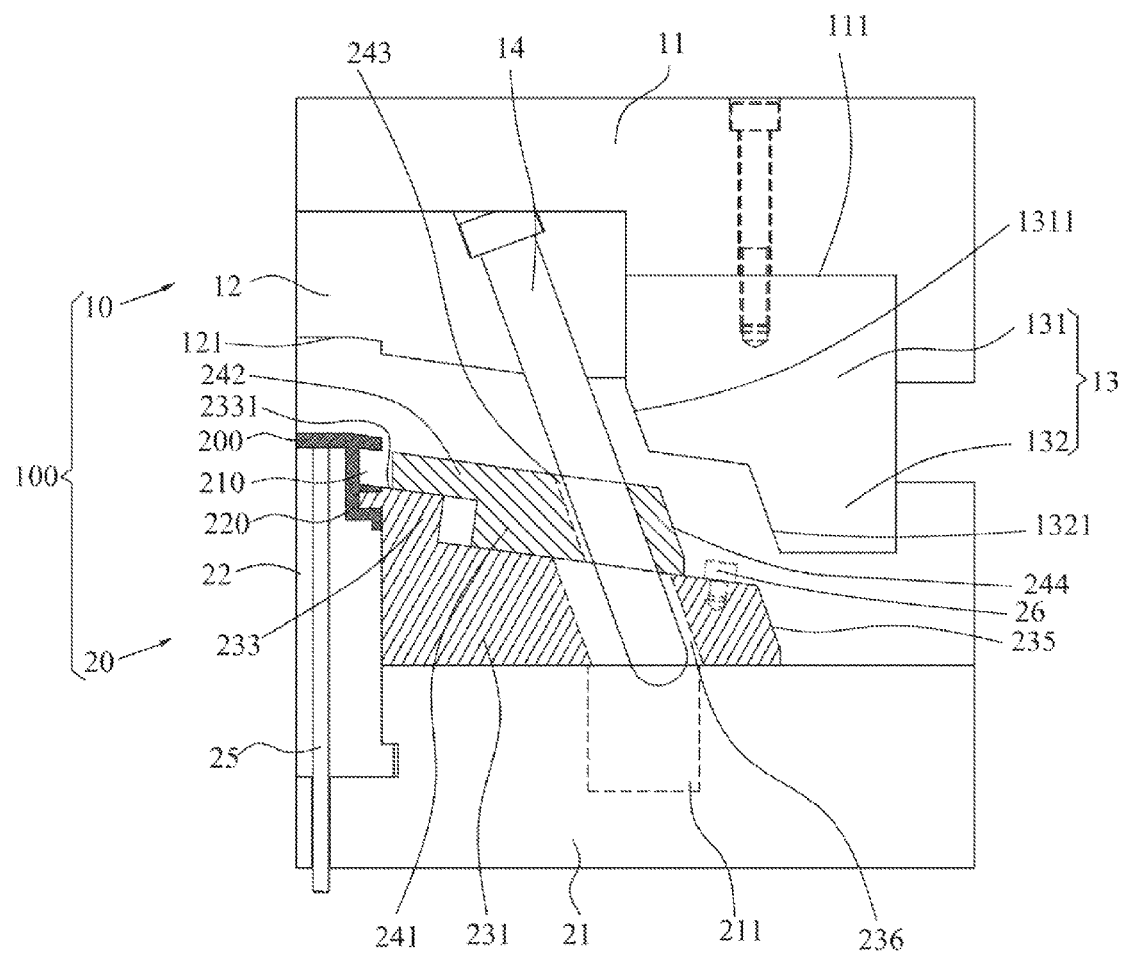
FIG. 2 is a partially sectional view of the injection mold of FIG. 1, wherein the injection mold is opened with a second sliding block being parted from the product to form an inclined groove at an upper portion of one side of the product.

With reference to FIG. 1 and FIG. 2, an embodiment of an injection mold 100 in accordance with the present invention is shown. The injection mold 100 adapted for molding a product 200 includes a female mold 10 and a male mold 20. The product 200 has an inclined groove 210 at an upper portion of a side thereof and a straight gap 220 at a lower portion of the side thereof and spaced from the inclined groove 210.

Figure 3:
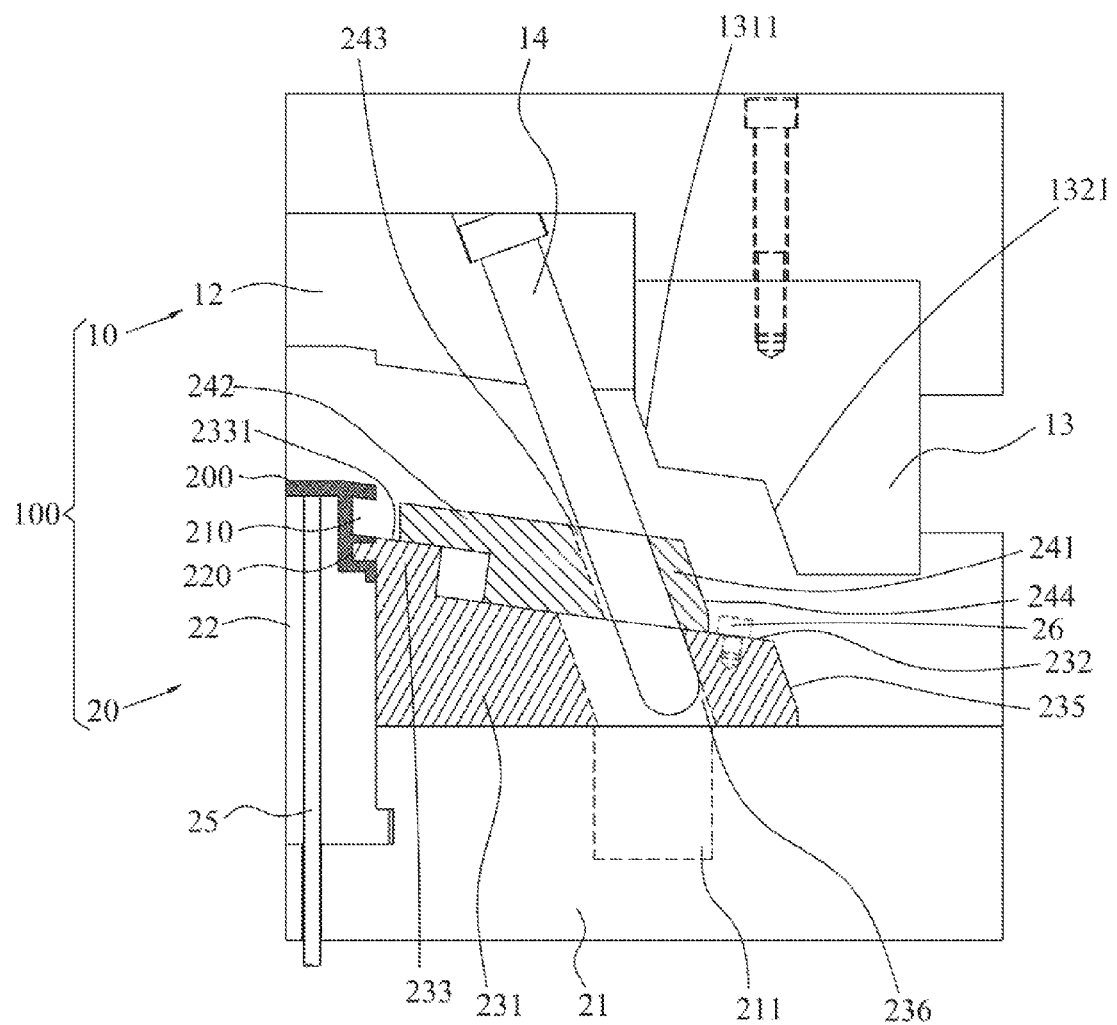
FIG. 3 is a partially sectional view of the injection mold of FIG. 2, wherein the injection mold is further opened with an inclined pillar resisting against an inner side face of an inserting space of a first sliding block and a straight bar of the first sliding block having no movement with respect to the product.
Figure 4:
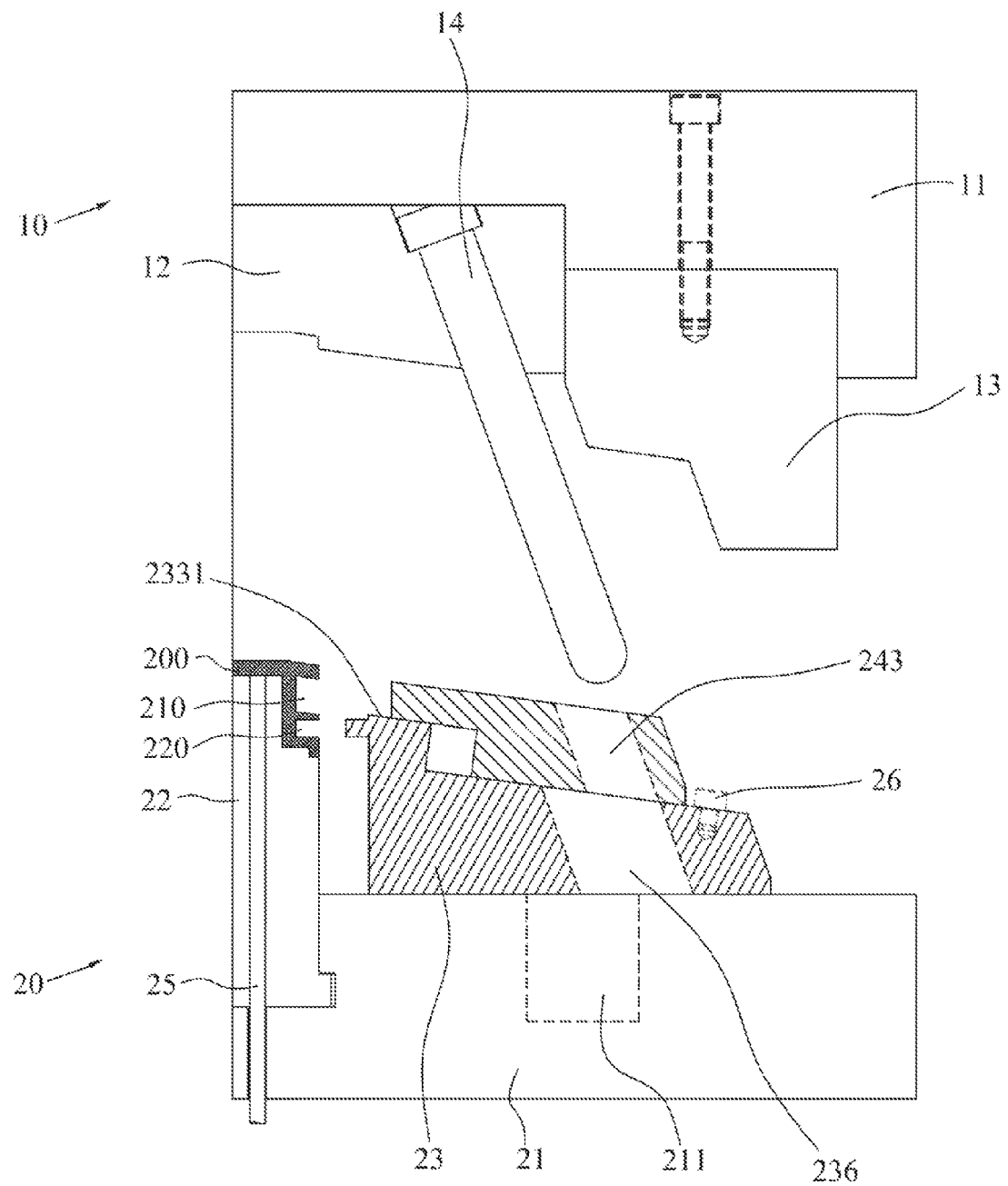
FIG. 4 is a partially sectional view of the injection mold of FIG. 3, wherein the injection mold is further opened with the straight bar of the first sliding block being parted from the product to form a straight gap at a lower portion of the one side of the product.
Figure 5:
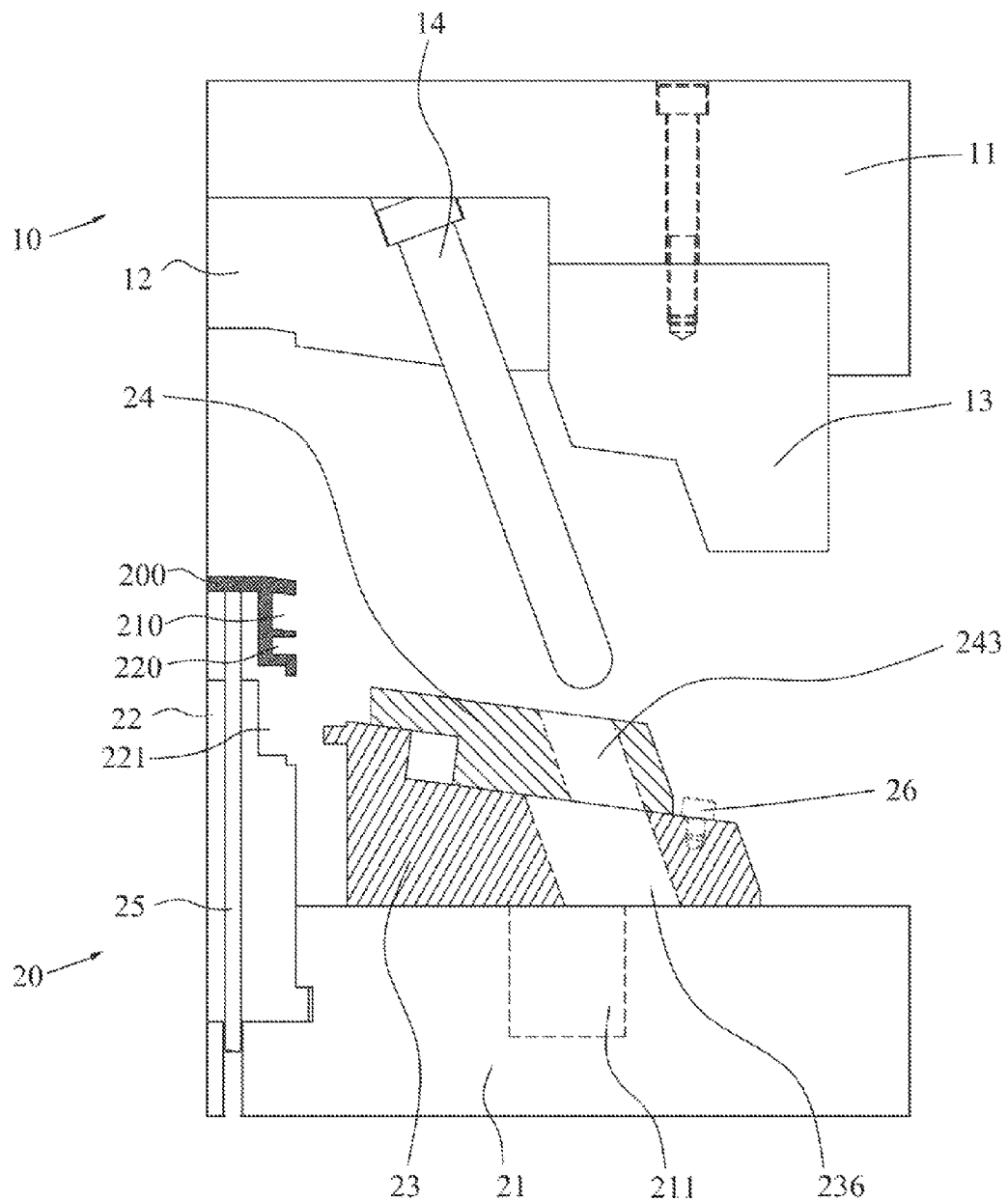
FIG. 5 is a partially sectional view of the injection mold of FIG. 4, wherein the injection mold is further opened to make the product ejected out therefrom.

Referring to FIG. 1, FIG. 2 and FIG. 3, the female mold 10 includes a female mold plate 11, a female core 12 mounted in a middle of a bottom of the female mold plate 11, a fastening block 13 and an inclined pillar 14. One side of the bottom of the female mold plate 11 defines a fastening groove 111. A middle of a bottom of the female core 12 is cut off to form a slot 121. The fastening block 13 includes a first fastening block 131 and a second fastening block 132 extending downward from one end of a bottom of the first fastening block 131. A lower portion of a side surface of the first fastening block 131 adjacent to the female core 12 is inclined away from the female core 12 to be designed as a first inclined pressing surface 1311. A side surface of the second fastening block 132 connected with a substantial middle of the bottom of the first fastening block 131 is parallel to the first inclined pressing surface 1311 to be designed as a second inclined pressing surface 1321.

The first fastening block 131 is inserted in the fastening groove 111 to fasten the fastening block 13 to the bottom of the female mold plate 11 with an upper portion of the side surface of the first fastening block 131 connecting with one end surface of the female core 12, and the other side surfaces of the first fastening block 131 and the second fastening block 132 being in alignment with each other. The inclined pillar 14 is slantwise mounted in the female mold plate 11 through the female core 12 with a lower portion thereof stretching under the female core 12 and spaced from the fastening block 13. The first inclined pressing surface 1311 and the second inclined pressing surface 1321 face to the lower portion of the inclined pillar 14 and are inclined along a direction substantially parallel to the inclined direction of the inclined pillar 14.

With reference to FIG. 1, FIG. 2 and FIG. 3, the male mold 20 includes a male mold plate 21, a male core 22 mounted in a middle of a top of the male mold plate 21, a first sliding block 23, a second sliding block 24, an ejector pin 25 and a limit element 26. A corner of a top of the male core 22 is cut off to define an opening 221. A substantial middle of one side of the top of the male mold plate 21 is concaved downward to define a receiving space 211. The male mold 20 defines an ejector pin hole 212 extending vertically to penetrate through the male mold plate 21 and the male core 22. The ejector pin 25 is movably inserted into the ejector pin hole 212. The first sliding block 23 includes a first sliding section 231 slidably mounted on the one side of the top of the male mold plate 21 and facing the opening 221. A top surface of the first sliding section 231 is inclined downward from one end thereof adjacent to the male core 22 to the other end thereof to be designed as an inclined guiding surface 232. The one end of the inclined guiding surface 232 adjacent to the male core 22 protrudes upward to form a fixing block 233 with a straight bar 234 being protruded towards the male core 22 from a top of an end surface of the fixing block 233. A top surface of the fixing block 233 is parallel to the inclined guiding surface 232 to be designed as a sliding surface 2331. An end surface of the first sliding section 231 far away from the male core 22 is designed as a first mating surface 235 matched with the second inclined pressing surface 1321. The first sliding section 231 defines an inserting space 236 extending slantwise to penetrate therethrough.

The second sliding block 24 includes a second sliding section 241 slidably mounted on the inclined guiding surface 232, and an inclined lump 242 protruded along a slantwise direction and towards the male core 22 from one end surface of the second sliding section 241 facing to the fixing block 233. A tilt angle of the inclined lump 242 is the same as that of the inclined guiding surface 232. The inclined lump 242 is located on the sliding surface 2331 of the fixing block 233. The other end surface of the second sliding section 241 is designed as a second mating surface 244 matched with the first inclined pressing surface 1311. The second sliding section 241 defines an inserting perforation 243 extending slantwise to penetrate therethrough. The inserting perforation 243 is narrower than the inserting space 236 in diameter for facilitating the second sliding block 24 away from the male core 22 ahead of the first sliding block 23 so as to make the inclined lump 242 of the second sliding block 24 and the straight bar 234 of the first sliding block 23 parted from the product 200 separately. The limit element 26 is mounted on one end of the inclined guiding surface 232 adjacent to the first mating surface 235.

With reference to FIGS. 1-4, when the injection mold 100 is closed, the female mold 10 moves downward to make a bottom end of the inclined pillar 14 inserted into the receiving space 211 through the inserting perforation 243 of the second sliding block 24 and the inserting space 236 of the first sliding block 23 so as to drive the first sliding block 23 and the second sliding block 24 to slide towards the male core 22 until the bottom of the female core 12 is against a top of the second sliding block 24 and an end surface of the first sliding section 231 facing to the male core 22 resists against the male core 22 with the first inclined pressing surface 1311 pressing on the second mating surface 244 and the second inclined pressing surface 1321 pressing on the first mating surface 235. At this time, the straight bar 234 and the inclined lump 242 are projected in the opening 221 and spaced from inner sidewalls of the opening 221. The ejector pin 25 has a top end thereof in alignment with a top surface of the male core 22. The top surface of the male core 22 is spaced from inner sidewalls of the slot 121 of the female core 12. A shaping cavity 30 is formed among the top surface of the male core 22, sidewalls of the opening 221, the inner sidewalls of the slot 121, the straight bar 234 and the inclined lump 242. Then thermoplastic resins are injected into the shaping cavity 30 of the injection mold 100. The thermoplastic resins are solidified for a predetermined time to form the product 200.

Referring to FIG. 1, FIG. 2, FIG. 3, FIG. 4 and FIG. 5, when the injection mold 100 is opened, the female mold 10 moves upward to drive the second sliding block 24 to slide away from the male core 22 under the action of the inclined pillar 14 and along the sliding surface 2331, the inclined guiding surface 232 and the first pressing surface 1311, to make the inclined lump 242 of the second sliding block 24 smoothly parted from the product 200 so as to form the inclined groove 210 at the upper portion of the side of the product 200. When the bottom end of the inclined pillar 14 is drawn out from the receiving space 211 and abuts against an inner side face of the inserting space 236, the first sliding block 23 slides away from the male core 22 along a longitudinal direction on the top of the male mold plate 21 to make the straight bar 234 parted from the product 200 steadily to form the straight gap 220 at the lower portion of the side of the product 200. In the meantime, the bottom end of the inclined pillar 14 is drawn out of the inserting space 236 and the inserting perforation 243. The second sliding block 24 is blocked by the limit element 26 to prevent the second sliding block 24 falling off from the inclined guiding surface 232 after the bottom end of the inclined pillar 14 is completely drawn out of the inserting perforation 243. At last, the product 200 is ejected upward out of the male mold 20 directly by the ejector pin 25.

As described above, the inserting space 236 is wider than the inserting perforation 243 in diameter for facilitating the second sliding block 24 away from the male core 22 ahead of the first sliding block 23 so as to make the inclined lump 242 of the second sliding block 24 and the straight bar 234 of the first sliding block 23 parted from the product 200 separately. Furthermore, the sliding surface 2331 is parallel to the inclined guiding surface 232, and the tilt angle of the inclined lump 242 is the same as that of the inclined guiding surface 232 to make the second sliding block 24 slide away from the male core 22 along the sliding surface 2331 and the inclined guiding surface 232 to make the inclined lump 242 of the second sliding block 24 smoothly parted from the product 200, and then, the first sliding block 23 slides away from the male core 22 along the longitudinal direction on the top of the male mold plate 21 to make the straight bar 234 parted from the product 200 steadily. So, the product 200 is effectively unloaded from the injection mold 100 to ensure a successful production of the product 200 to lower defective rate of the product 200 and decrease manufacturing cost of the product 200.

What is claimed is:

1. An injection mold for molding a product which has an inclined groove and a straight gap located at a side thereof and spaced from each other, comprising:
    a female mold including a female core mounted in a bottom of the female mold, and an inclined pillar slantwise mounted in the female mold with a bottom end thereof stretching under the female mold; and
    a male mold positioned under the female mold when the injection mold is closed, one side of a top of the male mold defining a receiving space, the male mold including:
        a male core mounted in the top of the male mold and spaced from the receiving space, and having a top thereof spaced from a bottom of the female core to define a shaping cavity therebetween for molding the product;
        a first sliding block slidably mounted on the one side of the top of the male mold, and having an inclined top surface designed as an inclined guiding surface, a straight bar being protruded towards the male core from an end surface of the first sliding block and projected into the shaping cavity, the first sliding block defining an inserting space extending slantwise to penetrate therethrough; and
        a second sliding block slidably mounted on the inclined guiding surface of the first sliding block, and having an inclined lump slantwise protruded towards the male core from one end surface of the second sliding block and projected into the shaping cavity, a tilt angle of the inclined lump being the same as that of the inclined guiding surface, the second sliding block defining an inserting perforation extending slantwise to penetrate therethrough, and narrower than the inserting space of the first sliding block in diameter, the bottom end of the inclined pillar being inserted into the receiving space through the inserting perforation and the inserting space so as to drive the first and second sliding blocks to slide towards the male core in process of closing the injection mold until the bottom of the female core against a top of the second sliding block and the first sliding block resisting against the male core;
    wherein when the injection mold is opened, the second sliding block slides away from the male core under the action of the inclined pillar and along the inclined guiding surface, to make the inclined lump of the second sliding block smoothly parted from the product so as to form the inclined groove at an upper portion of the side of the product, when the inclined pillar abuts against an inner side face of the inserting space, the first sliding block slides away from the male core on the top of the male mold to make the straight bar parted from the product to form the straight gap at a lower portion of the side of the product.

2. The injection mold as claimed in claim 1, wherein the male mold further includes a limit element mounted on one end of the inclined guiding surface away from the male core for preventing the second sliding block falling off from the inclined guiding surface after the inclined pillar is completely drawn out of the inserting perforation.

3. The injection mold as claimed in claim 1, wherein the first sliding block includes a first sliding section slidably mounted on the one side of the top of the male mold, one end of the inclined guiding surface adjacent to the male core protrudes upward to form a fixing block, a top surface of the fixing block is parallel to the inclined guiding surface to be designed as a sliding surface, the second sliding block includes a second sliding section slidably mounted on the inclined guiding surface, and the inclined lump is slantwise protruded towards the male core from one end surface of the second sliding section to be located on the sliding surface.

4. The injection mold as claimed in claim 3, wherein the female mold further includes a fastening block mounted to a side of the bottom of the female mold and spaced from the inclined pillar, the fastening block has a first fastening block and a second fastening block extending downward from one end of a bottom of the first fastening block, a lower portion of a side surface of the first fastening block is designed as a first inclined pressing surface facing the inclined pillar, a side surface of the second fastening block is parallel to the first inclined pressing surface to be designed as a second inclined pressing surface facing the inclined pillar, an end surface of the first sliding section far away from the male core is designed as a first mating surface matched with the second inclined pressing surface, the other end surface of the second sliding section is designed as a second mating surface matched with the first inclined pressing surface.

5. The injection mold as claimed in claim 3, wherein the shaping cavity includes an opening opened at a corner of the top of the male core and facing the first sliding block, an end surface of the fixing block protrudes towards the male core to form the straight bar, the inclined lump and the straight bar are projected into the opening.

6. The injection mold as claimed in claim 1, wherein the male mold includes an ejector pin vertically penetrating through the movable mold and the movable core for ejecting upward the product out of the male mold after the inclined lump and the straight bar are parted from the product.

* * * * *